…

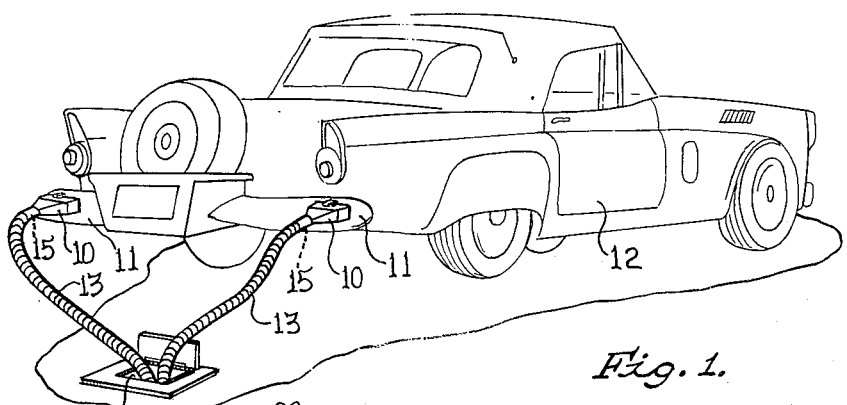
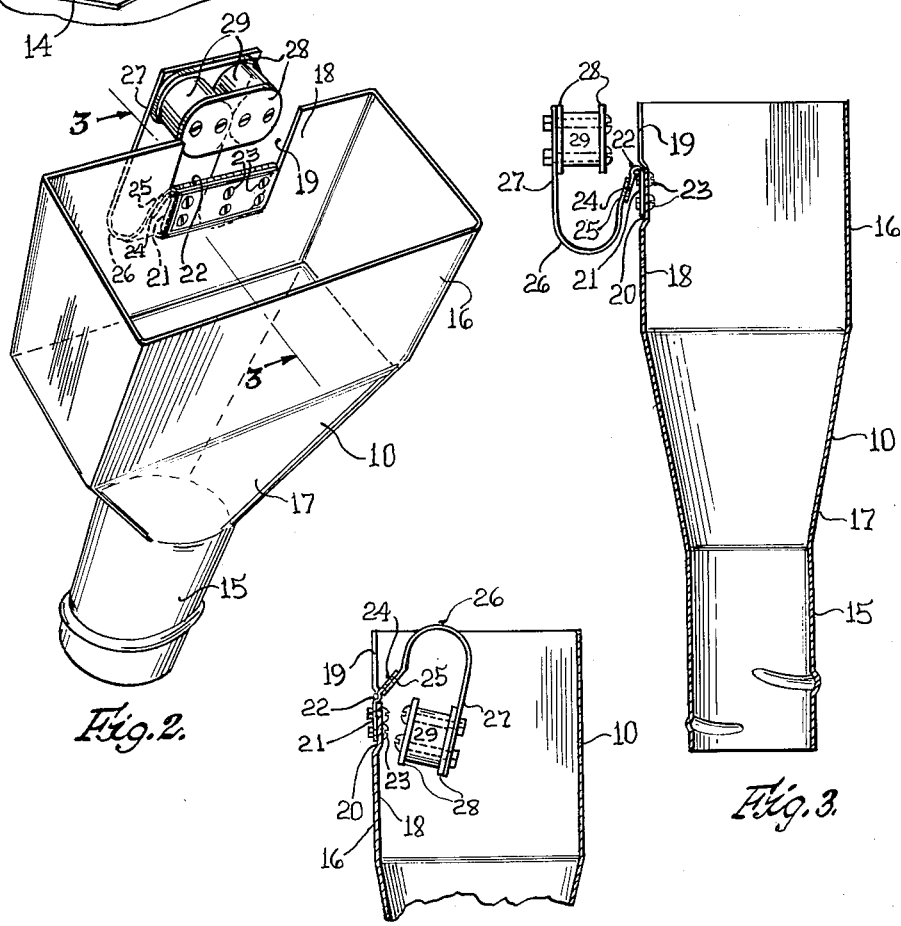

United States Patent Office 2,990,198
Patented June 27, 1961

2,990,198
MAGNETIC ADAPTOR FOR AN
EXHAUST PIPE
Cornell A. Imming, Elgin, Ill., assignor to Car-Mon Products Company, Chicago, Ill., a partnership
Filed Jan. 27, 1958, Ser. No. 711,534
1 Claim. (Cl. 285—9)

This invention relates to certain new and useful improvements in an adaptor for an exhaust pipe for use with a monoxide gas exhaust system and has for its principal object the provision of an improved construction of this character, which will be highly efficient in use and economical in manufacture.

The adaptor embodying my invention is connected to a flexible exhaust conduit movable in a guiding duct generally embedded in the floor of the building from which the gases from an automobile exhaust pipe are intended to be exhausted.

Prior to my invention, an adaptor of an exhaust system depended for its connection with the exhaust pipe of an automobile or the like, on frictional engagement therewith or on hooked connection with some part of the automobile body such as the chassis or the like.

I have found by actual experience that too frequently such an adaptor becomes disconnected from the exhaust pipe, with the result that much of the gases from the exhaust pipe are not conveyed by the flexible conduit from within the building or room where the automobile is located. In the case where the adaptor is intended to be connected to some part of the chassis of the automobile by means of a hook or the like, I have found that in practice to hook the adaptor to such chassis requires the attendant to crawl beneath the automobile. As modern cars are built with low chassis, the difficulty in so doing is at once appreciated. As a result thereof, the adaptor is either not hooked in place or is insecurely hooked with the result that it accidentally falls from engagement with the exhaust pipe of the automobile.

It is therefore an important object of this invention to provide an arrangement by which the adaptor, with the flexible exhaust conduit attached thereto, is magnetically attached to a metallic part of the automobile in a manner such that the adaptor will be securely held in place without use of bolts or requiring the attendant to crawl beneath the automobile.

It is another and equally important object of the invention to provide such connecting means of a construction whereby the adaptor may be quickly and easily disconnected from such metallic part of the automobile.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 1 is a perspective view of a monoxide gas system including an adaptor attached to a metallic part of an automobile to receive gases from the exhaust pipe of such automobile;

FIG. 2 is a perspective view of the adaptor embodying my invention;

FIG. 3 is a vertical sectional detail view taken substantially on line 3—3 of FIG. 2; and FIG. 4 is a fragmentary vertical sectional detail view similar to FIG. 3 but showing the connecting means disposed within the adaptor when the latter is not in use.

It is preferable that the several objects of my invention are accomplished by the preferred form of construction shown in the accompanying drawings.

In FIG. 1 of such drawings, I have shown my improved adaptor 10 connected to a bumper 11 of an automobile 12. Such adaptor 10 is connected to a flexible exhaust conduit 13 which extends into a guiding tube (not shown) connected to a floor receptacle 14. This receptacle 14 may, though not necessarily, be of the same construction as that shown in my Patent No. 2,765,752, dated October 9, 1956.

My improved adaptor 10 includes a neck portion 15 to which the conduit 13 is securely connected. The neck portion 15 is formed preferably an integral part of a rectangularly shaped hood 16, the inner end portion 17 of which is tapered to join the neck 15.

The wall 18 of the hood 16 has an open slot 19 formed therein. Mounted in a recessed portion 20 formed in the wall 18 inwardly of the slot 19, is a leaf 21 of a hinge 22. The leaf 21 is secured to the wall 18 by any suitable means such, for example, as screws 23 or, if desired, by spot welding. The other leaf 24 of the hinge 22 is in a like manner secured to one of the arms 25 of a substantially U-shaped flexible bracket 26.

Secured to the outer end portion of an arm 27 of the bracket 26 are spaced elongated plates 28 between which are arranged a pair of permanent magnetic discs or bars 29. The plates 28, as is the bracket 26, are formed preferably of brass so as not to deteriorate or be affected by the magnets 29.

The magnets 29 and their supporting bracket 26 are shown in FIGS. 2 and 3 in position for connecting the adaptor 10 to a metallic part of an automobile. In the illustration shown in FIG. 1, the exhaust pipe terminates through the bumper 11. By placing the hood 16 over the end of the exhaust pipe, the magnets 29 will be attracted and attached to the bumper 11. In such position the magnets will firmly hold the adaptor in place over the end of the exhaust pipe. When it is desired to remove the adaptor and to replace the flexible conduit 13 into the guide duct by passing the conduit through the floor receptacle 14, it is only necessary to break the magnetic hold of the magnets to the bumper, and this is accomplished by simply pulling the adaptor away from the bumper.

In a case where the hood 16 of the adaptor 10 is mounted to embrace the end of the exhaust pipe of an automobile, the adaptor is moved along the exhaust pipe until the magnets have contact with a magnetically attractable metallic part of the chassis, in which case the adaptor will be securely held in place during the exhaust operation. To so arrange the adaptor it will be obvious that it is not necessary that the attendant crawl beneath the automobile. He can attach the adaptor by merely stooping to a position sufficient to enable him to move the adaptor along the exhaust pipe for attachment to a metallic part of the automobile.

When the adaptor is not in use and to prevent damage of the mounting bracket 26 and the magnets 29 carried thereby, and to dispose the same in a position where they will not interfere with the placement of the adaptor within the receptacle 14 in the manner disclosed in my Patent No. 2,765,752, the bracket 26 with the magnets carried thereby may be pivoted to a position within the hood 16 as shown in FIG. 4, in which position the adaptor may be readily and conveniently placed in the receptacle 14.

While I have shown and described two magnets carried by the bracket 26, it is obvious that but a single magnet of appropriate size and strength may be used or, if found desirable, one may use more than two of such magnets.

As the bracket 26 is of a flexible structure, whenever the magnets take hold of the metallic part of the automobile, they will have a tendency to pull the hood 16 tightly against the part of the automobile engaged thereby. Such flexible structure also permits the magnets to self-adjust themselves to the surface contacted thereby under the influence of the magnetic flux passing between the magnets and the magnetically attractable support, so that the maximum contacting surface of the magnet will be in contact with the metallic part of the automobile.

To remove the adaptor, all that is necessary is to exert a pull on the adaptor in a direction from the automobile. This will result in breaking the magnetic hold of the magnets to the metallic part of the automobile and thus permit easy and ready removal of the adaptor from the exhaust pipe.

The adaptor may be formed of such material and in such shape as may best serve the purpose.

While I have illustrated my improved adaptor connecting with a gas exhaust system it is clearly obvious that it may be used for many other purposes. For instance, it may be supported free and clear from the automobile or it may be supported in close proximity to the motor of the same during welding operations to remove such gases as may be created by such operation.

The advantage of locating the magnets exteriorly of the hood 16 when in use results in preventing deposits collecting upon the magnets which would otherwise result if the magnets were within the hood. By my construction the hot gases from the exhaust pipe of the automobile do not come into contact with the magnets and there are no foreign matters which might be deposited on the magnets with possible resultant demagnetization.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claim.

Having thus described my invention, what I claim a new and desire to protect by Letters Patent is:

A device of the class described for connecting in oper communication a portable adaptor of an exhaust system to a magnetically attractable metal of an automobile exhaust comprising a substantially rectangularly shaped adaptor housing having formed in one wall thereof an open slot extending inwardly from one free edge thereof, a U-shaped flexible mounting bracket having one arm thereof hingedly connected to said one wall inwardly of said slot, a hinge for pivotally connecting said bracket to said one wall so that the same may be pivoted through said slot into and out of said adaptor housing, a permanent magnet fixedly attached to the other arm of said bracket adjacent the free end thereof so as to lie in the end plane of the free edge of said housing when said bracket is pivoted through said slot out of said housing in spaced parallel relation with respect thereto and into a self-adjusting position with respect to the metallically attractable metal part of the automobile exhaust.

References Cited in the file of this patent

UNITED STATES PATENTS

| | | |
|---|---|---|
| 2,441,913 | Taylor | May 18, 1948 |
| 2,519,435 | Byrd | Aug. 22, 1950 |
| 2,733,668 | Pfetzing | Feb. 7, 1956 |
| 2,765,752 | Imming | Oct. 9, 1956 |
| 2,770,849 | Gavey | Nov. 20, 1956 |
| 2,775,832 | Vizza | Jan. 1, 1957 |
| 2,793,057 | McGugin | May 21, 1957 |
| 2,824,575 | Rosen | Feb. 25, 1958 |
| 2,850,072 | Bryans | Sept. 2, 1958 |
| 2,869,900 | Heteji | Jan. 20, 1959 |
| 2,875,324 | Camp | Feb. 24, 1959 |

FOREIGN PATENTS

| | | |
|---|---|---|
| 492,612 | Germany | Mar. 3, 1930 |